(12) United States Patent
Nakao

(10) Patent No.: US 7,072,270 B2
(45) Date of Patent: Jul. 4, 2006

(54) METHOD AND DEVICE FOR DETECTING OPTICAL DATA AND READING-WRITING APPARATUS FOR OPTICAL DATA

(75) Inventor: Takashi Nakao, Saitama (JP)

(73) Assignee: Sony Corporation (JP)

( * ) Notice: Subject to any disclaimer, the term of this patent is extended or adjusted under 35 U.S.C. 154(b) by 77 days.

(21) Appl. No.: 11/001,045

(22) Filed: Dec. 2, 2004

(65) Prior Publication Data

US 2005/0094511 A1 May 5, 2005

Related U.S. Application Data

(62) Division of application No. 09/978,561, filed on Oct. 18, 2001, now Pat. No. 6,873,589.

(30) Foreign Application Priority Data

Oct. 20, 2000 (JP) .......................... P2000-321364
Jun. 27, 2001 (JP) .......................... P2001-193898

(51) Int. Cl.
*G11B 7/00* (2006.01)
(52) U.S. Cl. .................................. 369/112.03; 369/120
(58) Field of Classification Search ................... None
See application file for complete search history.

(56) References Cited

U.S. PATENT DOCUMENTS

| 5,475,665 A | 12/1995 | Tani et al. |
| 5,761,174 A | 6/1998 | Takeda et al. |
| 6,104,689 A | 8/2000 | Noguchi |

*Primary Examiner*—Paul W. Huber
(74) *Attorney, Agent, or Firm*—Rader, Fishman & Grauer PLLC; Ronald P. Kananen

(57) ABSTRACT

Light from a light source is applied to a diffraction grating via a collimator lens. The light diffracted by the diffraction grating is applied to a polarization beam splitter. The light polarized by the polarization beam splitter at a given polarizing plane is transmitted and is applied to a recording surface of an optical disc via a ¼-wave plate and an objective lens. The light reflected from the recording surface of the optical disc is applied to the polarization beam splitter via the objective lens and the ¼-wave plate and is reflected by the polarization beam splitter toward a focusing lens. The light incident to the focusing lens is thereby condensed and is applied to a holographic element which diffracts the light and disposes the focal points of the ±1 diffraction orders to be offset from each other along the optical axis of the zeroth diffraction order with the focal point of the zeroth diffraction order being between the focal points of the ±1 diffraction orders. The diffracted light is applied to a photo-detector via an optical element, for example, a flat plate disposed to be inclined with respect to the optical axis, for increasing the diameter of the diffracted light in a given direction.

12 Claims, 12 Drawing Sheets

FIG. 5
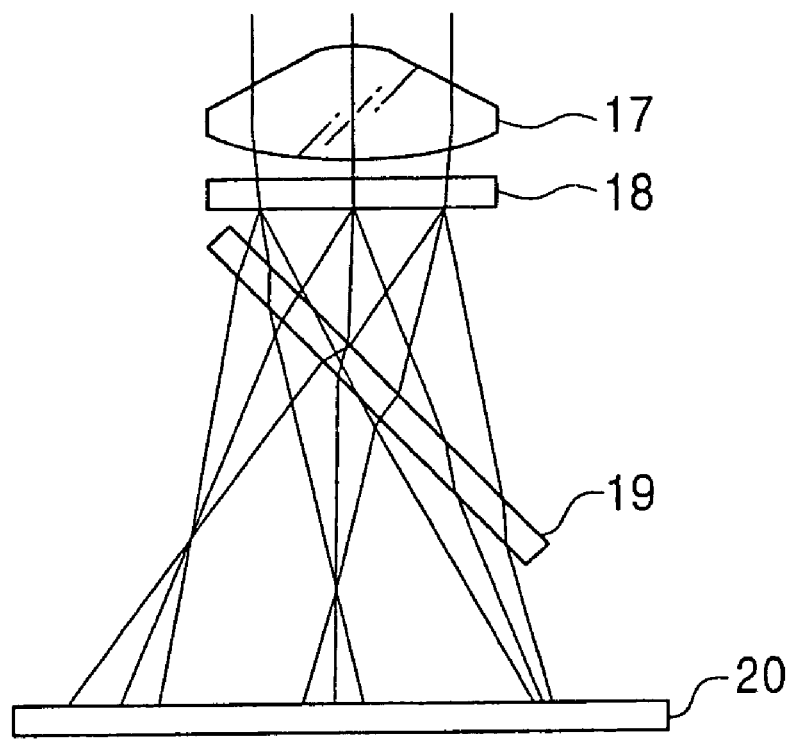
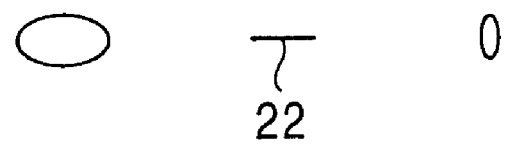
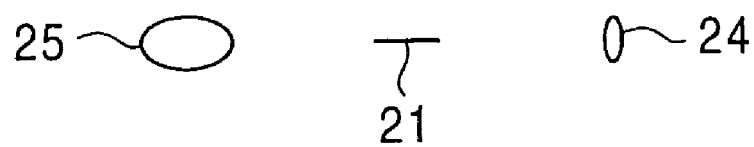
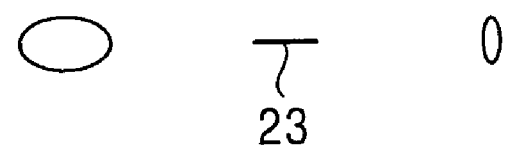

METHOD AND DEVICE FOR DETECTING OPTICAL DATA AND READING-WRITING APPARATUS FOR OPTICAL DATA

CROSS REFERENCE TO RELATED APPLICATIONS

The present application is a Divisional Application of the patent application Ser. No. 09/978,561, filed on Oct. 18, 2001 now U.S. Pat. No. 6,873,589, the entire contents of which are incorporated herein by reference.

BACKGROUND OF THE INVENTION

1. Field of the Invention

The present invention relates to methods for detecting optical data, optical devices for detecting optical data, and reading-writing apparatuses for optical data which are appropriately used for reading from and writing to media such as optical discs and magneto-optical discs. In particular, the present invention relates to a method for detecting optical data, an optical device for detecting optical data, and a reading-writing apparatus for optical data, in which, in a focus detecting system which uses a spot-size method using a holographic element, an optical element for increasing the size of a light spot formed on a photo-detector by zeroth diffraction order from the holographic element is provided, and tracking errors can be detected by a method such as a DPP (differential push-pull) method.

2. Description of the Related Art

In a reading-writing apparatus for reading and/or writing optical data from and/or on an optical medium such as an optical disc, tracking control for positioning light from a light source on a recording track of the recording medium and focusing control for focusing the light at a recording face of the recording medium are performed. An optical device for detecting optical data for performing such controls is disclosed in, for example, Japanese Unexamined Patent Application Publication No. 2000-11398.

In this optical device, light from a laser 60 is collimated by a collimator lens 61, and the collimated light is applied to a diffraction grating 62, as shown in FIG. 1. Light polarized in a given polarizing plane of zeroth diffraction order and ±1 diffraction orders diffracted by the diffraction grating 62 are transmitted by a polarization beam splitter 63 and are applied to a ¼-wave plate 64. The light applied to the ¼-wave plate 64 is converted from linearly polarized light into circularly polarized light, and the circularly polarized light is applied to a recording face of an optical disc 66 through an objective lens 65.

The light reflected from the recording face of the optical disc 66 is collimated by the objective lens 65. The collimated light is converted from circularly polarized light into linearly polarized light by the ¼-wave plate 64 in another polarizing plane differing by an angle of 90 degrees from the polarizing plane in which the light from the laser 60 is applied. The light emitted from the ¼-wave plate 64' is reflected by the polarization beam splitter 63 toward a focusing lens 67. The reflected light is condensed by the focusing lens 67, and is applied to a holographic element 68 provided with, for example, off-axis Fresnel zone plates. The light applied to the holographic element 68 is thereby diffracted. The holographic element 68 functions as a lens to dispose the focal points of the ±1 diffraction orders along the optical axis of the zeroth diffraction order with the focal point of the zeroth diffraction order being between the focal points of the ±1 diffraction orders.

The light diffracted by the holographic element 68 is applied to a roof prism 69 at the bottom face thereof. The roof prism 69 is disposed accurately such that the vertex of the roof prism 69 coincides with the optical axis of the zeroth diffraction order from the holographic element 68.

The ±1 diffraction orders and the zeroth diffraction order are emitted from the roof prism 69, each being divided into two light beams. The light is radiated to a photo-detector 70 disposed at the focal point of the zeroth diffraction order from the holographic element 68 and the focusing lens 67.

That is, the light from the laser 60 is radiated to the photo-detector 70 by being divided into, for example, the zeroth diffraction order and the ±1 diffraction orders.

The light is applied to the photo-detector 70 in the pattern shown, for example, in FIG. 2.

In FIG. 2, the zeroth diffraction order from the holographic element 68 corresponding to the zeroth. diffraction order from the diffraction grating 62 is divided into two components by the roof prism 69 and forms six light spots 6a to 6f on the photo-detector 70. The ±1 diffraction orders from the holographic element 68 corresponding to one of the ±1 diffraction orders from the diffraction grating 62 is divided into two components by the roof prism 69, thereby forming semicircular light spots 6g to 6j on the photo-detector 70.

The focal points of the ±1 diffraction orders from the holographic element 68 are offset from each other along the optical axis of the zeroth diffraction order with the focal point of the zeroth diffraction order being between the focal points of the ±1 diffraction orders, whereby the ±1 diffraction orders are defocused. Therefore, the light spots formed with the ±1 diffraction orders, which are circular, are each divided into two semicircular spots. The ±1 diffraction orders from the holographic element 68 corresponding to the other one of the ±1 diffraction orders are not shown in the drawing because they are not used by the photo-detector 70.

Tracking errors and focusing errors are detected with the light spots being formed on the photo-detector 70, as described above.

The photo-detector 70 is provided with photo-detecting parts 6A to 6F for detecting the light spots 6a to 6f, respectively, photo-detecting parts 6G to 6I for detecting the light spots 6g and 6h, and photo-detecting parts 6J to 6L for detecting the light spots 6i and 6j. Tracking control is performed by, for example, determining variations in the amount of light applied to the light spots 6a to 6f, and focusing control is performed by, for example, determining variations in the area of the light spots 6g to 6j.

In the above known optical device for detecting optical data, since the six light spots 6a to 6f are formed on the photo-detector 70 and the tracking errors are detected by using six determination signals, tracking errors can be easily detected by using a plurality of light spots, as in a DPP method or the like.

The light fluxes which are applied to the photo-detector 70 are each divided into two components by the roof prism 69, whereby the shapes of the light spots for detecting focusing errors, which are formed with the ±1 diffraction orders from the holographic element 68, differ from each other, as shown in FIG. 2. When the objective lens 65 focuses on the optical disc 66, the light spots 6i and 6j formed on the photo-detecting parts 6J to 6L separate from each other in a radial direction of the optical disc 66, and the light spots 6g and 6h formed on the photo-detecting parts 6G to 6I overlap each other, in which the light spots 6i and 6j and the light spots 6g and 6h are not symmetrical. Therefore, there is a problem in that displacement of the component parts of the optical device for detecting optical data easily affects the accuracy of detection of focusing errors.

There is another problem in that the photo-detector 70 tends to be large because the photo-detecting parts 6J to 6L, which receives light spots having an area larger than that of the photo-detecting parts 6G to 6I for the light spots 6g and 6h which overlap each other, must be used for detection of focusing errors and be positioned away from the photo-detecting parts 6A to 6F which receive the zeroth. diffraction order so that the light spots are prevented from overlapping each other.

Moreover, an optical component part such as the roof prism is required for splitting light fluxes, and the optical component parts must be formed with high accuracy and be mounted accurately because the shape and the position of the optical component parts determine the split position of the light fluxes.

SUMMARY OF THE INVENTION

Accordingly, it is an object of the present invention to provide an optical-data-detecting method, an optical device for detecting optical data, and a reading-writing apparatus for optical data, in which the reduction of the number of components, manufacturing costs of the components, and the sizes of the component parts is made possible.

It is another object of the present invention to provide an optical-data-detecting method, an optical device for detecting optical data, and a reading-writing apparatus for optical data, in which the symmetry of light spots formed on a photo-detector with ±1 diffraction orders is ensured, and the size of the photo-detector can be reduced.

To these ends, light which has been reflected by a recording medium is diffracted by a holographic element, the focal points of the ±1 diffraction orders are offset from each other along the optical axis of the zeroth diffraction order with the focal point of the zeroth diffraction order being between the focal points of the ±1 diffraction orders, and the diameter of at least the zeroth diffraction order is increased in a direction substantially perpendicular to a track of the recording medium. With this arrangement, highly-accurate manufacturing processes are not necessary and variations in mounting position of, for example, a photo-detector can be accurately determined, whereby the manufacture and control of the device can be easily performed.

According to a first aspect of the present invention, a method for applying light from a light source to a recording medium and detecting the light reflected from the recording medium comprises the steps of diffracting the reflected light; applying the diffracted light such that the focal points of the ±1 diffraction orders are offset from each other along the optical axis of the zeroth diffraction order with the focal point of the zeroth diffraction order being between the focal points of the ±1 diffraction orders; increasing the diameter of at least the zeroth diffraction order at least in a direction substantially perpendicular to a track of the recording medium; and determining the position of at least one light spot formed by the zeroth diffraction order at a first photo-detecting part divided at least in a direction substantially, perpendicular to the track of the recording medium.

According to a second aspect of the present invention, an optical-data-detecting device for applying light from a light source to a recording medium and detecting the light reflected from a recording medium comprises a holographic element for diffracting the reflected light and disposing the focal points of the ±1 diffraction orders to be offset from each other along the optical axis of the zeroth diffraction order with the focal point of the zeroth diffraction order being between the focal points of the ±1 diffraction orders; an optical element for increasing the diameter of at least the zeroth diffraction order at least in a direction substantially perpendicular to a track of the recording medium; and a first photo-detecting part divided at least in a direction substantially perpendicular to the track of the recording medium, for determining the position of at least one light spot formed by the zeroth diffraction order.

According to a third aspect of the present invention, a reading-writing apparatus for optical data, which performs at least one of reading and writing of the optical data with light from a light source being applied to a recording medium, comprises a holographic element for diffracting the light reflected by the recording medium and disposing the focal points of the ±1 diffraction orders to be offset from each other along the optical axis of the zeroth diffraction order with the focal point of the zeroth diffraction order being between the focal points of the ±1 diffraction order; an optical element for increasing the diameter of at least the zeroth diffraction order at least in a direction substantially perpendicular to a track of the recordind medium; a first photo-detecting part divided at least in a direction substantially perpendicular to the track of the recording medium, for determining the position of at least one light spot formed by the zeroth diffraction order; and a control unit for controlling the relative position between the track of the recording medium and the light applied to the track of the recording medium by using a differential output from the first photo-detecting part.

According to a fourth aspect of the present invention, a method for detecting optical data by applying light from a light source to a recording medium and detecting by a photo-detector the light which has been reflected by the recording medium and which carries data from the recording medium comprises the steps of diffracting the reflected light into ±1 diffraction orders and zeroth diffraction order so as to dispose the focal points of the ±1 diffraction orders to be offset from each other along the optical axis of the zeroth diffraction order with the focal point of the zeroth diffraction order being between the focal points of the ±1 diffraction orders; detecting the zeroth diffraction order by the photo-detector by increasing the diameter of the zeroth diffraction order in a direction substantially perpendicular to the direction of a track of the recording medium; and detecting the ±1 diffraction orders by the photo-detector, the ±1 diffraction orders forming circular light spots on the photo-detector.

According to a fifth aspect of the present invention, an optical-data-detecting device for applying light from a light source to a recording medium and detecting the light which has been reflected by the recording medium and which carries data from the recording medium comprises a holographic element for diffracting the light reflected by the recording medium into ±1 diffraction orders and zeroth diffraction order and disposing the focal points of the ±1 diffraction orders to be offset from each other along the optical axis of the zeroth diffraction order with the focal point of the zeroth diffraction order being between the focal points of the ±1 diffraction orders; a photo-detector disposed at the diffraction light-emission side of the holographic element, for detecting the ±1 diffraction orders and the zeroth diffraction order; and an optical element laminated on a light-receiving surface of the photo-detector, for applying the zeroth diffraction order to the photo-detector while increasing the diameter of the zeroth diffraction order in a direction substantially perpendicular to the direction of a track of the recording medium, and applying the ±1 diffraction orders to the photo-detector so that the ±1 diffraction orders form circular light spots on the photo-detector.

According to a sixth aspect of the present invention, a reading-writing apparatus for reading and writing optical data comprises a light source; a driving unit for driving a recording medium for rotation; an optical head for applying light from the light source to the rotating recording medium via an objective lens which is movably supported and detecting by a photo-detector via the objective lens the light which has been reflected by the recording medium and which carries data from a data-recording surface of the recording medium. The optical head comprises a holographic element for diffracting the light reflected by the recording medium into ±1 diffraction orders and zeroth diffraction order and disposing the focal points of the ±1 diffraction orders to be offset from each other along the optical axis of the zeroth diffraction order with the focal point of the zeroth diffraction order being between the focal points of the ±1 diffraction orders; a photo-detector disposed at the diffraction light-emission side of the holographic element, for detecting the ±1 diffraction orders and the zeroth diffraction order; and an optical element laminated on a light-receiving surface of the photo-detector, for applying the zeroth diffraction order to the photo-detector while increasing the diameter of the zeroth diffraction order in a direction substantially perpendicular to the direction of a track of the recording medium, and applying the ±1 diffraction orders to the photo-detector so that the ±1 diffraction orders form circular light spots on the photo-detector. The reading-writing apparatus also comprises a signal-processing circuit for forming a read signal in accordance with a detection signal outputted from the photo-detector; and a servo control circuit for moving the objective lens in accordance with the detection signal outputted from the photo-detector.

In the method for detecting optical data, according to the present invention, the light reflected from the recording medium is diffracted into ±1 diffraction orders and zeroth diffraction order so that the focal points of the ±1 diffraction orders are disposed to be offset from each other along the optical axis of the zeroth diffraction order with the focal point of the zeroth diffraction order being between the focal points of the ±1 diffraction orders. The zeroth diffraction order is applied to the photo-detector while the diameter of the zeroth diffraction order is increased in a direction substantially perpendicular to the direction of a track of the recording medium, and the ±1 diffraction orders are applied to the photo-detector such that the ±1 diffraction orders form circular light spots on the photo-detector.

Therefore, the symmetry of the light spots formed on the photo-detector by the ±1 diffraction orders can be ensured, and the size of the photo-detector can be reduced.

In the optical-data-detecting device according to the present invention, the light reflected by the recording medium is diffracted by a holographic element into ±1 diffraction orders and zeroth diffraction order and disposing the focal points of the ±1 diffraction orders to be offset from each other along the optical axis of the zeroth diffraction order with the focal point of the zeroth diffraction order being between the focal points of the ±1 diffraction orders. The zeroth diffraction order is applied to a photo-detector while the diameter of the zeroth diffraction order is increased by an optical element in a direction substantially perpendicular to a track of the recording medium. The ±1 diffraction orders are applied to the photo-detector so that the ±1 diffraction orders form circular light spots on the photo-detector.

Therefore, the symmetry of the light spots formed on the photo-detector by the ±1 diffraction orders can be ensured, and the size of the photo-detector can be reduced.

In the reading-writing apparatus for reading and writing optical data, according to the present invention, the light reflected from the recording medium is diffracted into ±1 diffraction orders and zeroth diffraction order such that the focal points of the ±1 diffraction orders are disposed to be offset from each other along the optical axis of the zeroth diffraction order with the focal point of the zeroth diffraction order being between the focal points of the ±1 diffraction orders. The zeroth diffraction order is applied to the photo-detector while the diameter of the zeroth diffraction order is increased in a direction substantially perpendicular to a track of the recording medium. The ±1 diffraction orders are applied to the photo-detector so as to form circular light spots thereon. The ±1 diffraction orders and the zeroth diffraction order are detected by the photo-detector.

With this arrangement, the symmetry of the light spots formed on the photo-detector by the ±1 diffraction orders can be ensured, and the size of the photo-detector can be reduced.

BRIEF DESCRIPTION OF THE DRAWINGS

FIG. 5 is a schematic view of the optical device according to the first embodiment, showing a critical portion thereof;

DESCRIPTION OF THE PREFERRED EMBODIMENTS

Figure 1:
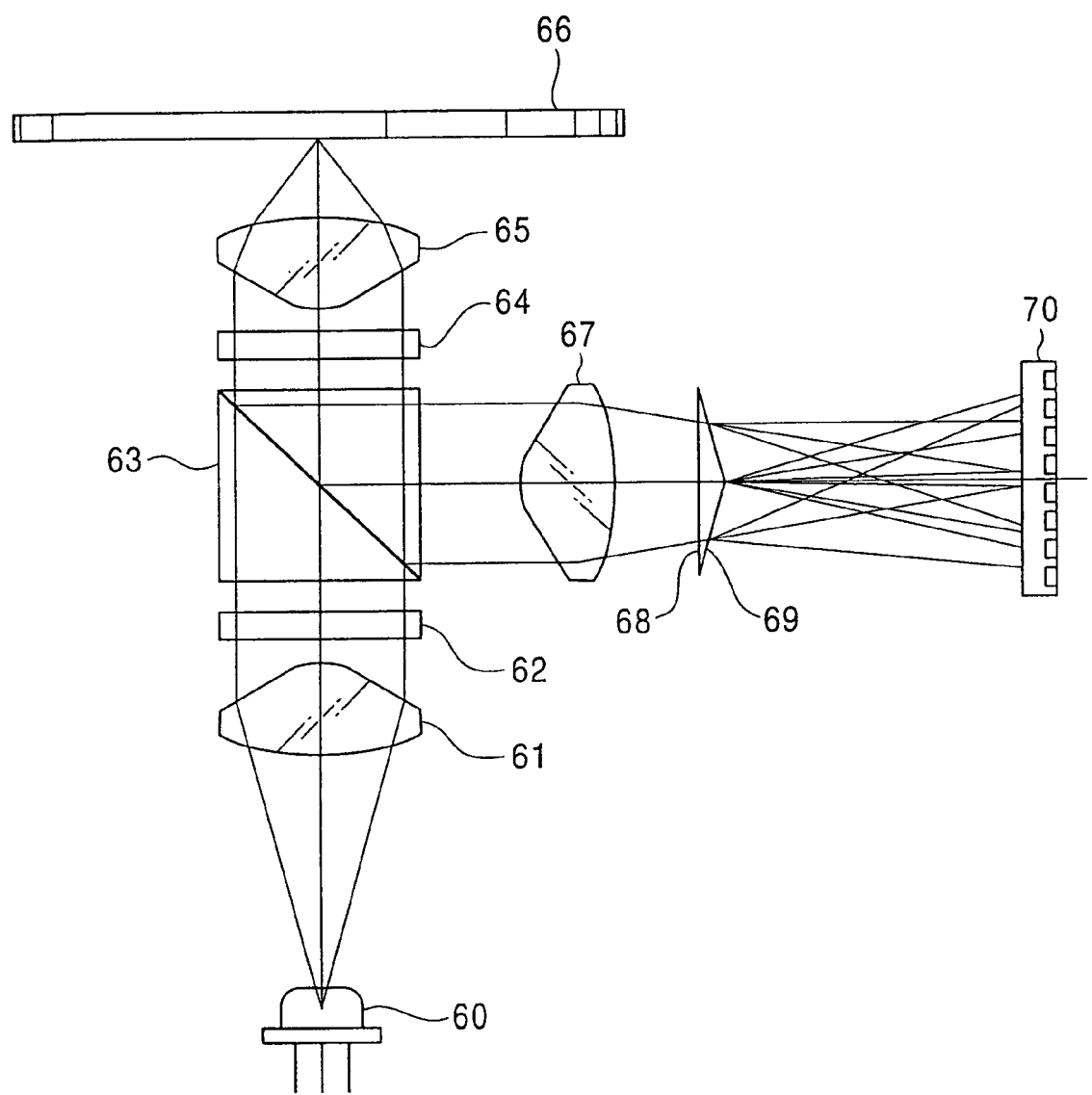
FIG. 1 is a schematic view of a known optical device for detecting optical data.
Figure 2:
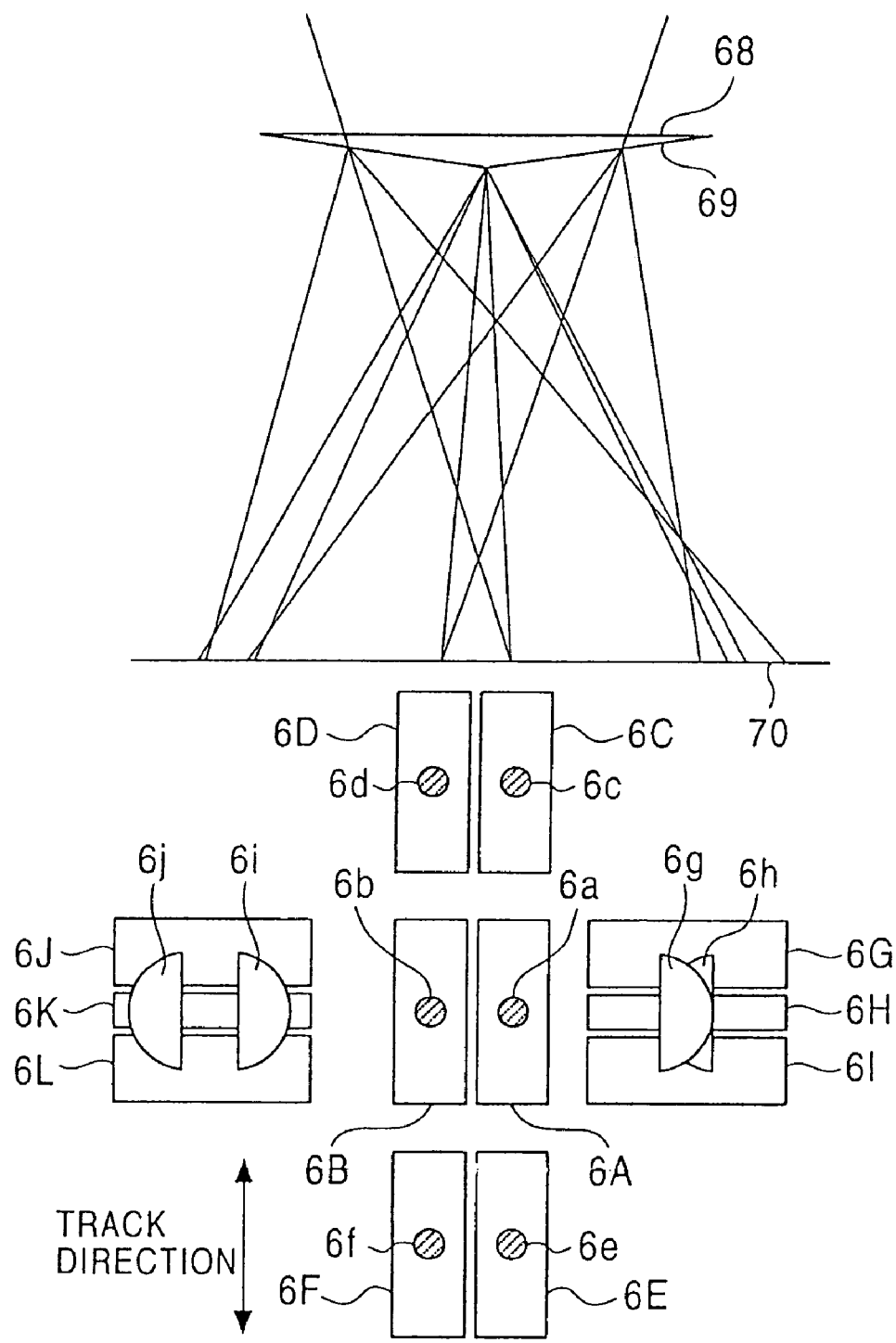
FIG. 2 is a schematic view showing a pattern of spots of light applied to photo-detecting parts of a photo-detector used in the known optical device.
Figure 3:
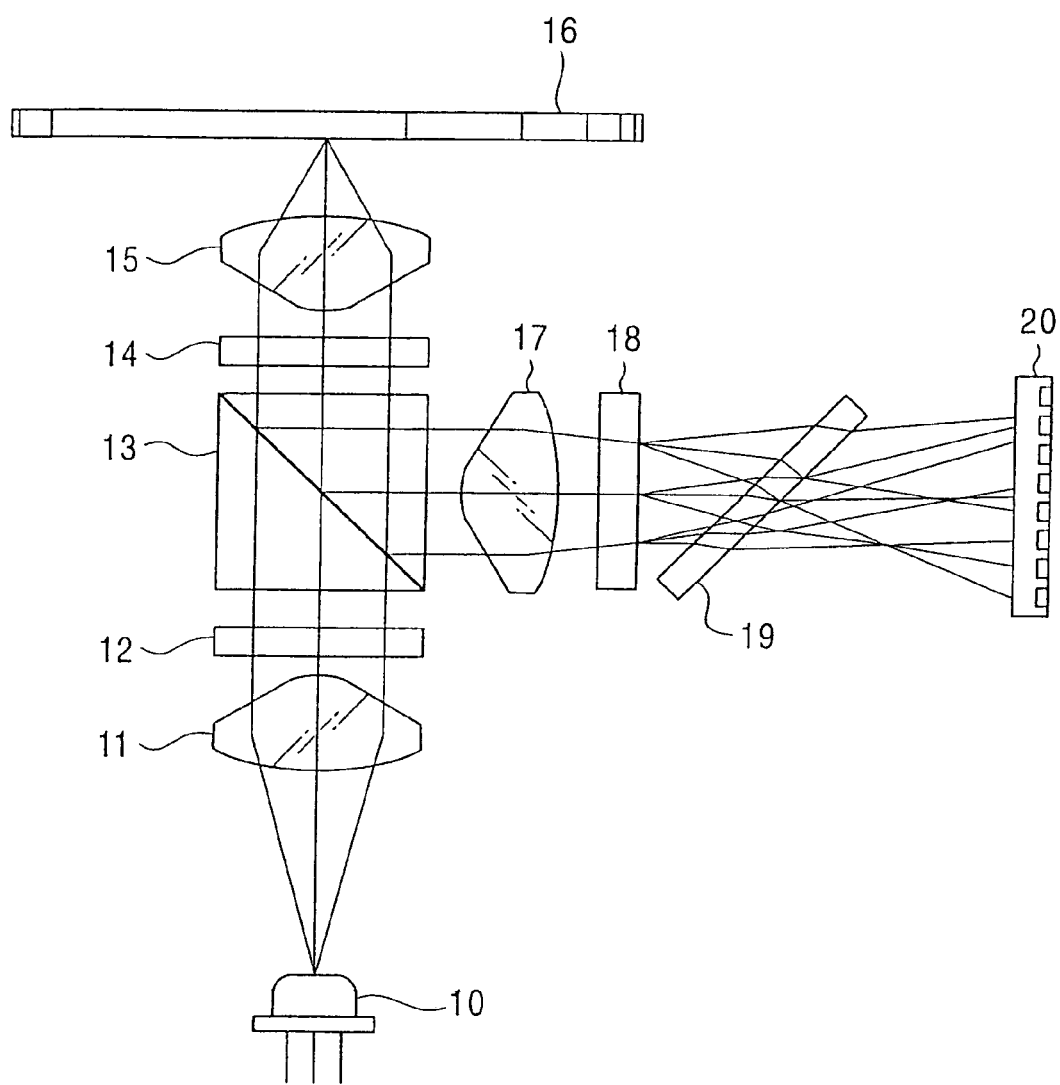
FIG. 3 is a schematic view of an optical device for detecting optical data, according to a first embodiment of the present invention, the optical device using an optical-data-detecting method according to the present invention.

Embodiments according to the present invention are described below with reference to the drawings. FIG. 3 is a schematic view of an optical device for detecting optical data, according to a first embodiment of the present invention. The optical device uses an optical-data-detecting method according to the present invention.

In FIG. 3, light emitted by a laser 10 is collimated by a collimator lens 11. The collimated light is applied to a diffraction grating 12. Only light polarized in a given polarizing plane of, for example, the zeroth diffraction order and the ±1 diffraction orders diffracted by the diffraction grating 12 are transmitted by a polarization beam splitter 13 and are applied to a ¼-wave plate 14. The light applied to the ¼-wave plate 14 is converted from linearly polarized light into circularly polarized light, and is applied to an optical disc 16 through an objective lens 15.

The zeroth diffraction order and the ±1 diffraction orders of the light radiated to the optical disc 16 are applied to the same track of the optical disc 16. In this case, for example, the zeroth diffraction order is radiated to an intermediate part of the track in the width direction, the ±1 diffraction order is radiated to the track at a part thereof slightly offset toward the inner side of the optical disc 16, and the −1 diffraction order is radiated to the track at a part thereof slightly offset toward the outer side of the optical disc 16.

The light reflected at the recording face of the optical disc 16 is collimated by the objective lens 15. The collimated light which is converted from circularly polarized light into linearly polarized light by the ¼-wave plate 14 in another polarizing plane differing by an angle of 90 degrees from the polarizing plane in which the light from the laser 10 is applied. The light emitted from the ¼-wave plate 14 is reflected by the polarization beam splitter 13 toward a focusing lens 17. The reflected light is condensed by the focusing lens 17, and is applied to a holographic element 18 provided with, for example, off-axis Fresnel zone plates.

The light applied to the holographic element 18 is each diffracted thereby. The holographic element 18 functions as a lens to dispose the focal points of the ±1 diffraction orders to be offset from each other along the optical axis of the zeroth diffraction order with the focal point of the zeroth diffraction order being between the focal points of the ±1 diffraction orders. The light from the holographic element 18 is radiated to a photo-detector 20 through a flat plate 19 which is inclined with respect to the optical axis and serves to increase the diameter of the light in a given direction.

Figure 4:
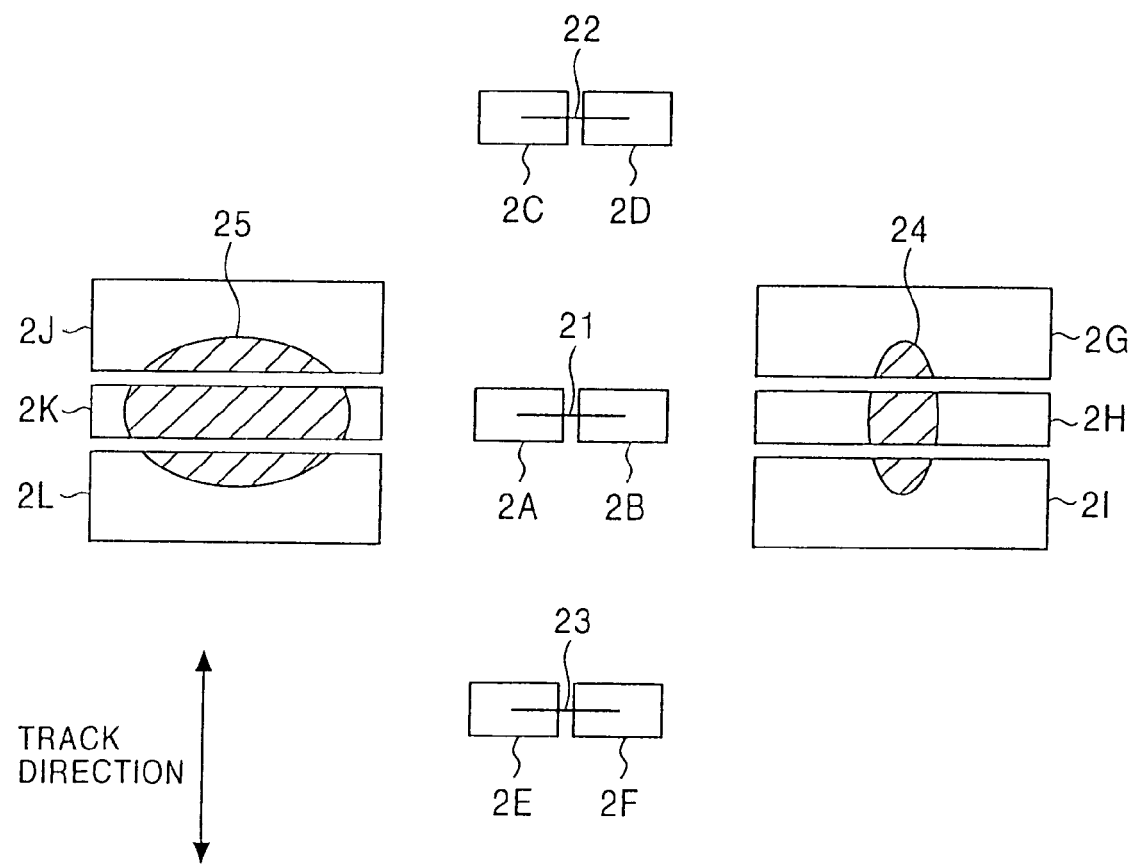
FIG. 4 is a schematic view showing a pattern of spots of light applied to photo-detecting parts of a photo-detector used in the optical device according to the first embodiment of the present invention.

In the optical device according to the first embodiment, a pattern of light spots is formed on the photo-detector 20, as shown in FIG. 4. In FIG. 4, the zeroth diffraction order from the holographic element 18 corresponding to the zeroth diffraction order from the diffraction grating 12 forms light spots 21, 22, and 23 in lines, each extending in a direction substantially perpendicular to a track of the optical disc 16. The ±1 diffraction orders from the holographic element 18 corresponding to the zeroth diffraction order from the diffraction grating 12 forms elliptic light spots 24 and 25.

With the flat plate 19 being inclined with respect to the optical axis, the diameter of the light transmitted by the flat plate 19 is enlarged in the inclination direction because the length of the paths of the transmitted light are changed by the inclination of the flat plate 19, whereby the focal points of the light are moved. The movement of the focal points occurs when viewed along the incident surface of the flat plate 19 although the movement does not occur when viewed along the optical axis.

With this arrangement, the diameter of the zeroth diffraction order from the holographic element 18 is increased in a direction substantially perpendicular to the track of the optical disc 16, and the zeroth diffraction order forms the linear light spots 21 to 23 on the photo-detector 20, as shown in FIG. 4. The amount of light of the linear light spots 21, 22, and 23 varies between the right and left sections of each of the linear light spots 21, 22, and 23 in accordance with the positions of the light applied to the track. The linear light spots 21, 22, and 23 are disposed in photo-detecting parts 2A and 2B, 2C and 2D, and 2E and 2F, respectively, on the photo-detector 20. The photo-detecting parts 2A and 2B, 2C and 2D, and 2E and 2F are respectively separated from each other in a direction substantially perpendicular to the track of the optical disc 16.

Tracking control is performed by a DPP method using determination signals SA to SF from the photo-detecting parts 2A to 2F, respectively. A tracking error signal STE for tracking control is obtained from the following expression in which α denotes a constant.

$$STE=(SA-SB)-\alpha\{(SC-SD)+(SE-SF)\}/2 \quad (1)$$

In the above expression (1), when correctly performing tracking, the determination signals SA=SB, SC=SD, and SE=SF, whereby the tracking error signal STE=0. When tracking is offset toward the inner side, the determination signal SC>SD, whereby the tracking error signal STE<0. When tracking is offset toward the outer side, the determination signal SE<SF, whereby the tracking error signal STE>0. Therefore, tracking is controlled so that the tracking error signal STE=0.

Thus, tracking control is performed by determining variations in the amount of light applied to the light spots 21, 22, and 23 between the photo-detecting parts 2A and 2B, 2C and 2D, and 2E and 2F, respectively. An optical element for increasing the diameter of at least the zeroth diffraction order at least in a direction substantially perpendicular to the track direction is used instead of the roof prism which is used in the known optical device described above, whereby an assembling process which requires high accuracy such as positioning of the roof prism is not necessary. Therefore, reliable tracking control can be performed by using a simple optical device.

Since the light spots 21 to 23 are each formed in line, variations in position of the light spots 21 to 23 in the photo-detecting parts 2A to 2F can be determined in addition to the variations in the amount of light. That is, when the amount of light does not vary between the right and left portions of each of the light spots 21 to 23, each of the determination signals SA to SF varies between the photo-detecting parts 2A, 2C, or 2E and the photo-detecting parts 2B, 2D, or 2F, respectively, whereby the position of each of the light spots 21 to 23 can be determined. With this arrangement, variations in position at which the photo-detector 20 is mounted during manufacturing can be detected.

The diameter in the vertical direction in FIG. 4 of the diameter of each of the ±1 diffraction orders from the holographic element 18 is constant, and the diameter in the horizontal direction is increased or decreased. With this arrangement, when the focal distance of the light spot 24 is smaller than that of the light spot 21, the diameter of the light spot 24 is increased in the horizontal direction, and the diameter of the light spot 25 having the focal distance larger than the light spot 21 is decreased in the horizontal direction.

The light spot 24 is formed on the photo-detecting parts 2G to 2I which are disposed along the track of the optical disc 16, and the light spot 25 is formed on the photo-detecting parts 2J to 2L which are disposed along the track of the optical disc 16.

The diameters in the vertical direction of the light spots 24 and 25 become uniform when the focal point of the light forming the light spot 21 coincides with recording face of the optical disc 16. When the focal point of the light forming the light spot 21 is offset from the recording face of the optical disc 16, the diameter in the vertical direction of one of the light spots 24 and 25 becomes larger than that of the other one of the light spots 24 and 25. The relationship between the diameters in the vertical direction of the light spots 24 and 25 varies in accordance with the direction of the offset of the focal point of the light forming the light spot 21 from the recording face of the optical disc 16.

Focusing control by using a spot-size method is performed by using the determination signals SG to SI and the determination signals SJ to SL from the photo-detecting parts 2G to 2I and the photo-detecting parts 2J to 2L, respectively. A focusing error signal SFE for performing the focusing control is obtained from the following expression.

$$SFE=\{SH-(SG+SI)\}-\{SK-(SJ+SL)\} \quad (2)$$

The focusing error signal SFE=0 is obtained by expression (2) when focusing is correctly controlled. When defocusing, the focusing error signal SFE becomes positive or negative in accordance with the defocusing direction, in which focusing is controlled so that the focusing error signal SFE becomes zero. The focusing method described above is the same method as is described in Japanese Unexamined Patent Application Publication No. 2000-11398.

When the optical disc 16 as a recording medium is a CD-ROM (compact disc-read only memory) by which reading is performed in units of bits or is a DVD-RAM (digital versatile disc-random access memory) by which reading and writing are performed by using a phase change, an output signal SRF is obtained by determining variations in the amount of light by, for example, the following expression.

$$SRF=SA+SB \quad (3)$$

When the optical disc 16 as a recording medium is an MO (magneto-optical disc) such as an MD (mini disc) from which the output signal SRF cannot be determined by using the variations in the amount of light, the optical device according to the present embodiment can be used for determining the tracking error signal STE and the focusing error signal SFE except for the output signal SRF. That is, the optical device according to the present embodiment can be used in a reading-writing apparatus which uses such a magneto-optical disc.

According to the present embodiment, the reflected light from a recording medium is diffracted by the holographic element 18, the focal points of the ±1 diffraction orders from the holographic 18 are disposed to be offset from each other along the optical axis of the zeroth diffraction order with the focal point of the zero-order diffracted light being between the focal points of the ±1 diffraction orders, and the diameter of at least the zeroth diffraction order is increased in a direction substantially perpendicular to the track of the recording medium, whereby assembly requiring high accuracy is not necessary and variations in positioning of the photo-detector 20 are accurately determined, thereby easily performing the manufacture and control of the optical device.

In the known device, a roof prism is used for splitting the light; therefore, highly accurate positioning of the roof prism is required for, for example, accurately detecting errors in tracking, and the manufacture and control of the known device cannot be performed easily because highly accurate determination of variations in position at which a photo-detector is mounted cannot be performed. However, according to the present invention, these drawbacks are easily overcome.

The flat plate 19 may be mounted by using a structure which rotates the flat plate 19 about the optical axis of the light forming the light spot 21. With this arrangement, the light spots 21 to 25 formed on the photo-detector 20 are moved in a direction substantially parallel to the track of the optical disc 16 by rotating the flat plate 19. Although the light spots 21 to 25 move along a part of a large circle, the movement may be considered as a linear movement in a small area such as that which corresponds to the photo-detector 20.

The holographic element 18 may also be mounted by using a structure which rotates the holographic element 18 about the optical axis of the light which forms the light spot 21. With this arrangement, the light spots 21 to 25 formed on the photo-detector 20 can revolve about the light spot 21 as a center of the revolution when rotating the holographic element 18. By combining the substantially parallel movement and the rotational movement, the photo-detector 20, for example, can be easily mounted.

For example, in mounting of the photo-detector 20, the photo-detector 20 is mounted to a reference position. Positioning of the photo-detector 20 in a rotational direction about the light spot 21 with respect to the light spots 21 to 25 is performed by rotating the holographic element 18, and positioning of the photo-detector 20 in a direction substantially parallel to the track of the optical disc 16 with respect to the light spots 21 to 25 is performed by rotating the flat plate 19. Then, positioning of the photo-detector 20 in a direction substantially perpendicular to the track of the optical disc 16 is performed.

Positioning of the photo-detector 20 in a direction substantially perpendicular to the track of the optical disc 16 can be performed by setting the determination signals SA and SB from the photo-detecting parts 2A and 2B, respectively, equal to each other. The positioning described above in the rotational direction can be performed by using the determination signals SC to SF of the photo-detecting parts 2C to 2F, respectively. The above positioning in a direction substantially parallel to the track of the optical disc 16 can be performed by using the determination signals SG and SI and the determination signals SJ and SL from the photo-detecting parts 2G and 2I and the photo-detecting parts 2J and 2L, respectively.

A control mechanism may be provided at a mounting part of the photo-detector 20 for positioning the photo-detector 20 in a direction substantially perpendicular to the track of the optical disc 16. Although another control mechanism may be provided at the mounting part of the photo-detector 20 for positioning the photo-detector 20 in the rotational direction and in a direction substantially parallel to the track of the optical disc 16, the positioning can be performed more appropriately by rotating the holographic element 18 and/or the flat plate 19, as described above.

Figure 6A:
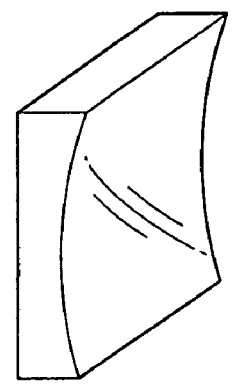
FIGS. 6A, 6B, and 6C are perspective views of major component parts of the optical device according to the first embodiment of the present invention.
Figure 6B:
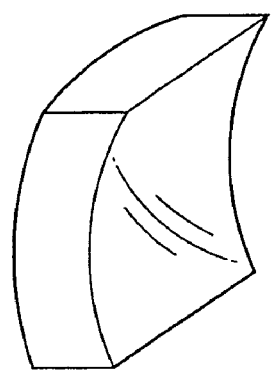
Figure 6C:
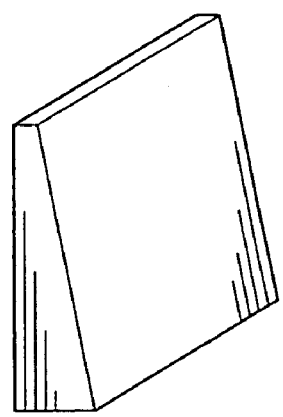

The optical element for increasing the diameter of light in a given direction is not limited to a flat plate 19, and it may be, for example, a cylindrical lens shown in FIG. 6A, a compound lens shown in FIG. 6A which is a combination of a lens and a cylindrical lens, or a wedge plate shown in FIG.

6C. The optical element may cooperate with the focusing lens 17 or be integrated with the holographic element 18.

The method for determining the tracking error signal STE is not limited to a DPP method in which the zeroth diffraction order and the ±1 diffraction orders from the diffraction grating 12 are each divided into a plurality of light beams which form light spots on the photo-detector 20 and the difference of the amount of light of each light spot is determined. The tracking error signal STE may be determined by a three-spot method in which side spots (light spots formed by ±1 diffraction orders) of the light from the diffraction grating 12 are used on the photo-detector 20 without being divided, or by a push-pull method which does not use the diffraction grating 12.

The positions of the holographic element 18 and the optical element (the flat plate 19) which increases the diameter of light are not limited to those which are described in the above embodiment. The holographic element 18 and the flat plate 19 may be disposed at any positions between the objective lens 15 and the photo-detector 20. The optical element (the flat plate 19) is not necessarily disposed next to the holographic element 18, as described in the first embodiment. The holographic element 18 and the flat plate 19 may be disposed independently from each other, or they may be disposed in an inverse order.

Figure 7:
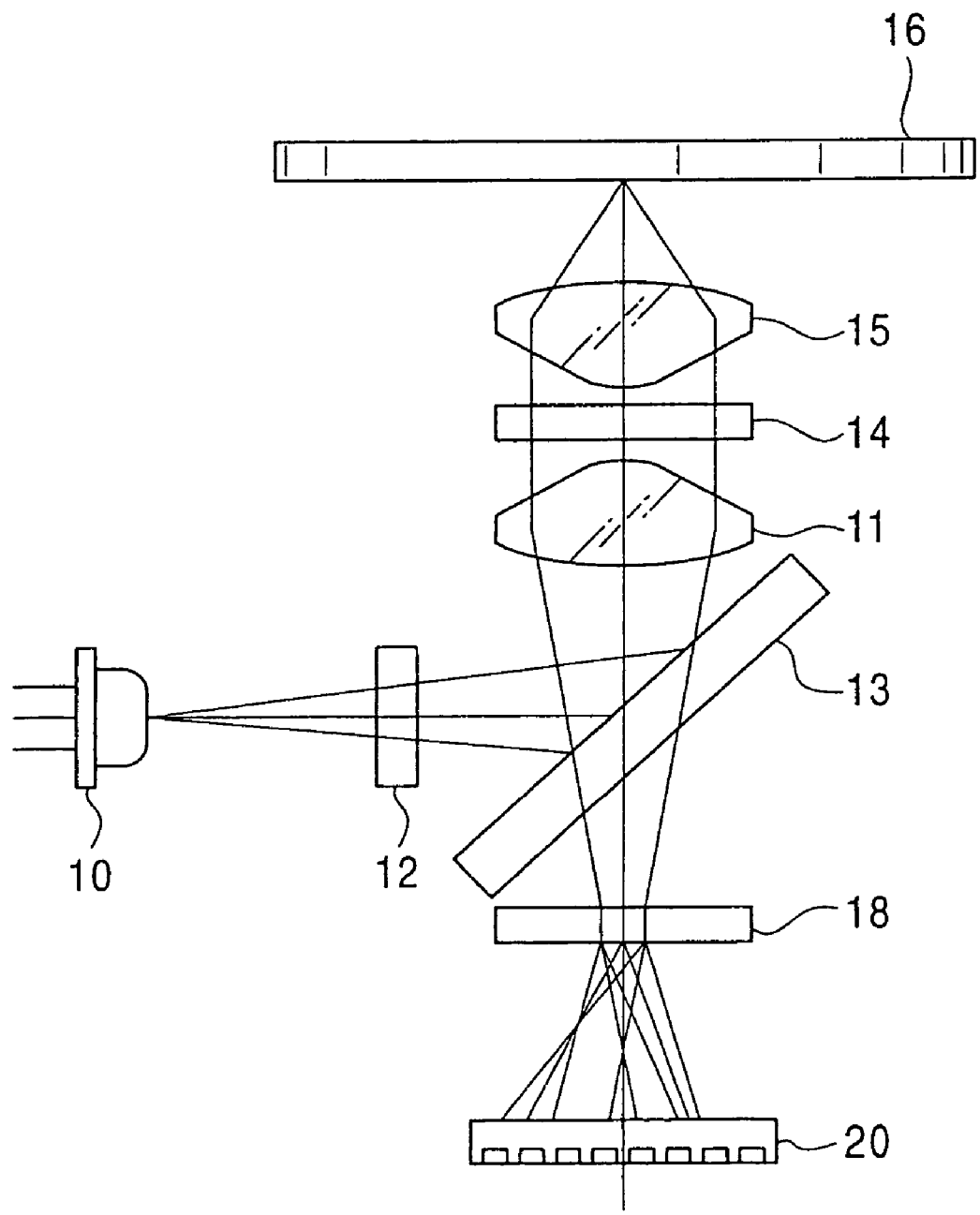
FIG. 7 is a schematic view of an optical device for detecting optical data, according to a second embodiment of the present invention.

A second embodiment is described below with reference to FIG. 7, in which an optical device includes a flat plate 19 and a polarization beam splitter 13 integrated with each other. In FIG. 7, light from a laser 10 is applied to a diffraction grating 12, and is converted into, for example, zeroth diffraction order and ±1 diffraction orders. The diffracted light is applied to the polarization beam splitter 13 integrated with the flat plate 19, and the light polarized in a given polarizing plane is reflected.

The reflected light is collimated by a collimator lens 11. The collimated light is applied to a ¼-wave plate 14. Circularly polarized light converted from linearly polarized light by the ¼-wave plate 14 is radiated to a recording face of an optical disc 16 via an objective lens 15. Zeroth diffraction order and ±1 diffraction orders are radiated to the optical disc 16. The zeroth diffraction order is applied to an intermediate part of a track in the width direction and the ±1 diffraction orders are applied to the parts of the same track slightly offset toward the inner and outer sides, respectively, of the optical disc 16.

The light reflected from the optical disc 16 is collimated by the objective lens 15. The collimated light is converted from linearly polarized light into circularly polarized light by the ¼-wave plate 14 in a polarizing plane differing by an angle of 90 degrees from the polarizing plane in which the light from the diffraction grating 12 is applied. The reflected light is condensed by the collimator lens 11 and is applied to the polarization beam splitter 13 integrated with the flat plate 19. The light reflected from the optical disc 16 is transmitted by the polarization beam splitter 13 integrated with the flat plate 19 and is emitted, for example, downward in the drawing.

The flat plate 19 integrated with the polarization beam splitter 13 is disposed at a face of the polarization beam splitter 13 opposite to the optical disc 16 and is inclined with respect to the optical axis of the light transmitted by the polarization beam splitter 13. The flat plate 19 serves as an optical element which increases the diameter of the light in a given direction. The light transmitted by the polarization beam splitter 13 which is integrated with the flat plate 19 is applied to a holographic element 18 provided with, for example, off-axis Fresnel zone plates.

The holographic element 18 diffracts the light incident thereto and functions as a lens to dispose the focal points of the ±1 diffraction orders to be offset from each other along the optical axis of the zeroth diffraction order with the focal point of the zeroth diffraction order being between the focal points of the ±1 diffraction orders. The light diffracted by the holographic element 18 is applied to a photo-detector 20.

In the above-described method for detecting optical data, light radiated by a light source is applied to a recording medium and the light reflected from the recording medium is detected. A holographic element, which diffracts the reflected light and disposes the focal points of the ±1 diffraction orders to be offset from each other along the optical axis of the zeroth diffraction order with the focal point of the zeroth diffraction order being between the focal points of the ±1 diffraction orders, is provided. Also, an optical element, which increases the diameter of at least the zeroth diffraction order at least in a direction substantially perpendicular to a track of a recording medium, is provided. With this arrangement, variations in the mounting position of the photo-detector 20 are accurately determined with the position of the zeroth diffraction order being detected at least by the photo-detecting parts of the photo-detector 20 disposed in a direction substantially perpendicular to the track of the recording medium.

The above-described optical device for detecting optical data, which applies light emitted from a light source to a recording medium and detects the light reflected from the recording medium, is provided with a holographic element, which diffracts the reflected light and disposes the focal points of the ±1 diffraction orders to be offset from each other along the optical axis of the zeroth diffraction order with the focal point of the zeroth diffraction order being between the focal points of the ±1 diffraction orders, an optical element, which increases the diameter of at least the zeroth diffraction order at least in a direction substantially perpendicular to a track of a recording medium, and a photo-detector which includes photo-detecting parts disposed in a direction substantially perpendicular to the track of the recording medium. With this arrangement, an optical device in which manufacturing processes requiring high accuracy are not necessary and which can be manufactured and controlled easily is obtainable.

A third embodiment according to the present invention is described below, in which a flat plate 19 is provided integrally with a photo-detector, whereby the optical device can be reduced in size and positioning during assembly can be easily performed.

Figure 8:
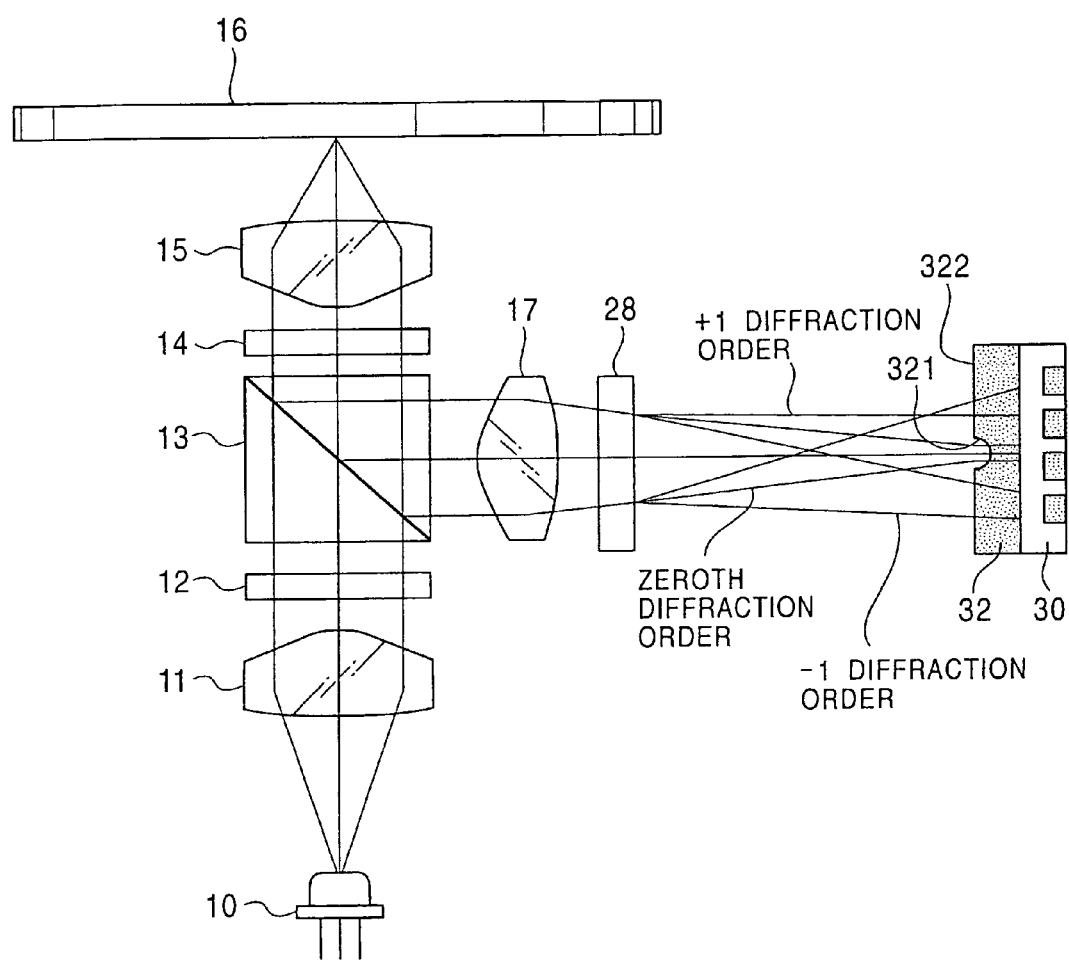
FIG. 8 is a schematic view of an optical device for detecting optical data, according to a third embodiment of the present invention.
Figure 9:
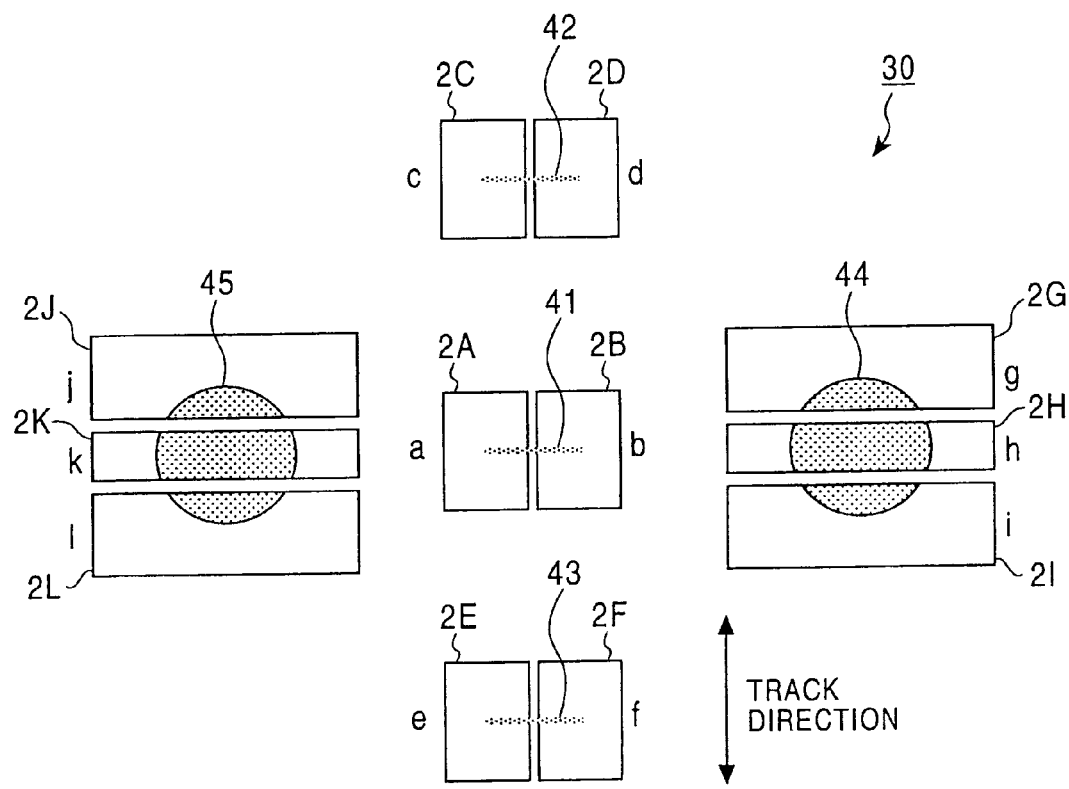
FIG. 9 is a schematic view showing a pattern of spots of light applied to photo-detecting parts of a photo-detector used in the optical device according to the third embodiment of the present invention.

FIG. 8 is a schematic view of an optical device for detecting optical data, according to the third embodiment, the optical device using a method for detecting optical data, according to the present invention. FIG. 9 is an illustration showing patterns of photo-detecting parts of the photo-detector and light spots formed on the photo-detecting parts, according to the third embodiment of the present invention.

In FIG. 8, the optical device for detecting optical data includes a laser 10, a collimator lens 11 disposed at the light-emission side of the laser 10, a diffraction grating 12 disposed at the collimated-light-emission side of the collimator lens 11, and a polarization beam splitter 13 disposed at the diffracted-light-emission side of the diffraction grating 12. The optical device includes a ¼-wave plate 14 disposed at the emission side of the polarization beam splitter 13 of the diffracted light which has been split by the polarization beam splitter 13, and an objective lens 15 for focusing the light transmitted by the ¼-wave plate 14 on a recording face of a recording disc 16. The optical device also includes a focusing lens 17 disposed at the emission side of the polarization beam splitter 13 of the light reflected at the optical disc 16 and split by the polarization beam splitter 13, a holographic element 28 disposed at the light-emission side of the focusing lens 17, a photo-detector 30 disposed at the diffracted-light-emission side of the holographic element 28, and an optical element 32 laminated on the photo-detector 30.

The optical element 32 functions as a lens to increase the diameter of zeroth diffraction order in a direction perpendicular to a track of the optical disc 16, the zeroth diffraction order being incident to the photo-detector 30 by being diffracted by the holographic element 28. The optical element 32 applies ±1 diffraction orders diffracted by the holographic element 28 to the photo-detector 30 and forms circular light spots on the photo-detector 30 with the ±1 diffraction orders.

The optical element 32 is provided with a cylindrical concave lens 321 at a part of the optical element 32 to which the zeroth diffraction order is applied. The cylindrical concave lens 321 has a curvature in a direction perpendicular to the track of the optical disc 16. The optical element 32 is formed planar at a section 322 thereof outside the cylindrical concave lens 321, to which the ±1 diffraction orders are applied.

The optical device for detecting optical data, according to the third embodiment, operates as follows. Light from the laser 10 is collimated by the collimator lens 11, and the collimated light is applied to the diffraction grating 12. The collimated light is split into zeroth diffraction order and ±1 diffraction orders, which individually advance linearly, by the diffraction grating 12, and is applied to the polarization beam splitter 13. The polarization beam splitter 13 splits the light incident thereto into the light transmitted by the diffraction grating 12 and the light reflected by the recording face of the optical disc 16. The light split and transmitted by the polarization beam splitter 13 is applied to the ¼-wave plate 14. The light incident to the ¼-wave plate 14 is converted from linearly polarized light into circularly polarized light, and the circularly polarized light is focused on the recording face of the optical disc 16 via the objective lens 15.

The light reflected from the recording face of the optical disc 16 is collimated by the objective lens 15. The collimated light is converted from circularly polarized light into linearly polarized light by the ¼-wave plate 14 in a polarizing plane which differs by an angle of 90 degrees from the polarizing plane in which the light from the laser 10 is applied, and the linearly polarized light is emitted toward the polarizing beam splitter 13. The light reflected from the optical disc 16 is split by the polarization beam splitter 13 and is emitted toward the focusing lens 17. The light condensed by the focusing lens 17 is applied to the holographic element 28 provided with, for example, off-axis Fresnel zone plates. The holographic element 28 splits the incident light into ±1 diffraction orders for forming a focusing error signal and zeroth diffraction order for forming an RF signal and a tracking error signal.

The holographic element 28 functions as a lens to dispose the focal points of the ±1 diffraction orders along the optical axis of the zeroth diffraction order with the focal point of the zeroth diffraction order being between the focal points of the ±1 diffraction orders.

The ±1 diffraction orders and the zeroth diffraction order are applied to the photo-detector 30 via the optical element 32.

Since the cylindrical concave lens 321, which has a curvature in a direction perpendicular to the track direction, is formed at a part of the optical element 32 to which the zeroth diffraction order is applied, the zeroth diffraction order is affected by a lens effect of the cylindrical concave lens 321 of the optical element 32 so that the focal distances of the light components, which are disposed in a direction perpendicular to the track direction, of the zeroth diffraction order transmitted by the optical element 32 are increased toward the rear side of the light-receiving surface of the photo-detector 30, whereby the zeroth diffraction order form light spots 41, 42, and 43 (see FIG. 9) on the photo-detector 30 so as to each extend in a direction perpendicular to the track of the optical disc 16. Therefore, the light spots 41 to 43 of the zeroth diffraction order can be each partially detected.

The planar section 322 of the optical element 32 to which the ±1 diffraction orders from the holographic element 28 are applied does not function as a lens. Therefore, the ±1 diffraction orders are directly transmitted by the optical element 32 and are applied to the photo-detector 30, whereby the ±1 diffraction orders form circular light spots 44 and 45 on the photo-detector 30, as shown in FIG. 9.

FIG. 9 shows photo-detecting parts of the photo-detector 30, for forming an RF signal and a tracking error signal, the photo-detecting parts for forming a focus error signal, and the light spots 41 to 43 and the light spots 44 and 45 of the zeroth diffraction order and the ±first-order diffraction fluxes, respectively.

In FIG. 9, the photo-detector 30 is provided with photo-detecting parts 2A and 2B, 2C and 2D, and 2E and 2F which receive the zeroth diffraction order for a main spot for forming the light spot 41, and the zeroth diffraction order for two side spots for forming the light spots 42 and 43, and which form an RF signal and a tracking error signal. The photo-detector 30 is also provided with photo-detecting parts 2G, 2H, and 2I which receive the ±1 diffraction order for forming the light spot 44 for a focus error signal, and photo-detecting parts 2J, 2K, and 2L which receive the −1 diffraction order for forming the light spot 45 for the focusing error signal. The photo-detecting parts 2A to 2F and the photo-detecting parts 2G to 2L output light-determination signals a to f and g to l, respectively.

When the photo-detecting parts 2A to 2L of the photo-detector 30 receive the light via the optical element 32 and the corresponding light spots are formed on the photo-detector 30, the light-determination signals a to l are outputted by the photo-detecting parts 2A to 2L, and are current-voltage-converted by an amplifier (not shown), whereby a focusing error signal $S_{FE}$, a tracking error signal $S_{TE}$, and an RF signal are computed by a computation circuit (not shown), as described below.

The tracking error signal $S_{TE}$ is obtained by the following expression, in which α denotes a constant.

$$S_{TE}=(a-b)-\alpha \times \{(c-d)+(e-f)\}/2 \qquad (4)$$

In expression (4), when tracking is correctly controlled, the light-determination signals a=b, c=d, and e=f, whereby the tracking error signal $S_{TE}=0$. When tracking is not correctly controlled, the light-determination signals a>b or a<b, c>d or c<d, and/or e>f or e<f, whereby the tracking error signal $S_{TE}>0$ or $S_{TE}<0$. Therefore, tracking control is performed by a differential push-pull method so that the tracking error signal $S_{TE}=0$.

The focusing error signal $S_{FE}$ is obtained by the following expression.

$$S_{FE}=\{(h-(g+i)\}-\{(k-(j+)\} \quad (5)$$

In expression (5), when focusing is correctly controlled, the focusing error signal $S_{FE}=0$. When focusing is not correctly controlled, the focusing error signal $S_{FE}$ becomes positive or negative according to the defocusing direction; therefore, focusing control is performed by a spot-size method so that the focusing error signal $S_{FE}=0$.

When the optical disc 16 is a recording medium from which reading is performed in units of bits, such as a CD-ROM, or a recording medium which reads and writes by using a phase change, such as a DVD-RAM, an output signal $S_{RF}$ is obtainable by determining variations in the amount of light by using the following expression.

$$S_{RE}=a+b \quad (6)$$

When the optical disc 16 is a recording medium including a magneto-optical disc such as a MD (mini disc) in which the RF signal $S_{RF}$ cannot be obtained from variations in the amount of light, the optical device according to the present embodiment can be used for determining the tracking error signal $S_{TE}$ and the focusing error signal $S_{FE}$ other than the output signal $S_{RF}$. That is, the optical device according to the present embodiment can be also used in a reading-writing apparatus which uses a recording medium such as a magneto-optical disc.

In the optical device according to the present embodiment, the optical element 32 provided with the cylindrical concave lens 321 having a curvature in a direction perpendicular to the track direction is laminated on the photo-detector 30, the light reflected from the optical disc 16 as a recording medium is diffracted into ±1 diffraction orders and zeroth diffraction order by using the holographic element 28, and the zeroth diffraction order is applied to the photo-detector 30 through the cylindrical concave lens 321 formed in the optical element 32 such that the diameter of the zeroth diffraction order is enlarged in a direction perpendicular to the track direction. The ±1 diffraction orders are applied to the photo-detector 30 through the optical element 32 without being affected by a lens effect thereof such that the ±1 diffraction orders form circular light spots on the photo-detector 30. Therefore, splitting or division of the diffracted light for determining RF signals, tracking errors, and focusing errors can be easily performed, whereby the tracking errors and focusing errors can be accurately and stably detected.

Since the light spots formed by the ±1 diffraction orders from the holographic element 28 are not deformed, are circular, and are symmetrical, variations in position of the optical component parts of the optical device for detecting optical data are not likely to affect against the detection of focusing errors.

The light spots formed on the photo-detector 30 by the ±1 diffraction orders are circular, whereby the diameters of the light spots of the ±1 diffraction orders can be reduced in a radial direction of the optical disc 16 compared with a known optical device and a distance of the light spots from the light spots of the zeroth diffraction order can be also reduced. Therefore, the photo-detecting parts for the zeroth diffraction order and the photo-detecting parts for the ±1 diffraction orders can be disposed at small distances from each other, thereby reducing the size of the photo-detector 30.

Since the optical element 32 is laminated on the photo-detector 30, independent supporting and positioning structures for the optical element 32 are not necessary, whereby the number of component parts can be reduced, and reduction of the manufacturing costs and the size of the optical device for detecting optical data can be made possible.

The reduction of the size and the manufacturing costs of the optical device for detecting optical data can be advanced by forming the optical element 32 and the photo-detector 30 by integral molding.

The optical element 32 which is laminated on the photo-detector 30 can be a protective member for protecting the light-receiving surface of the photo-detector 30.

Figure 10:
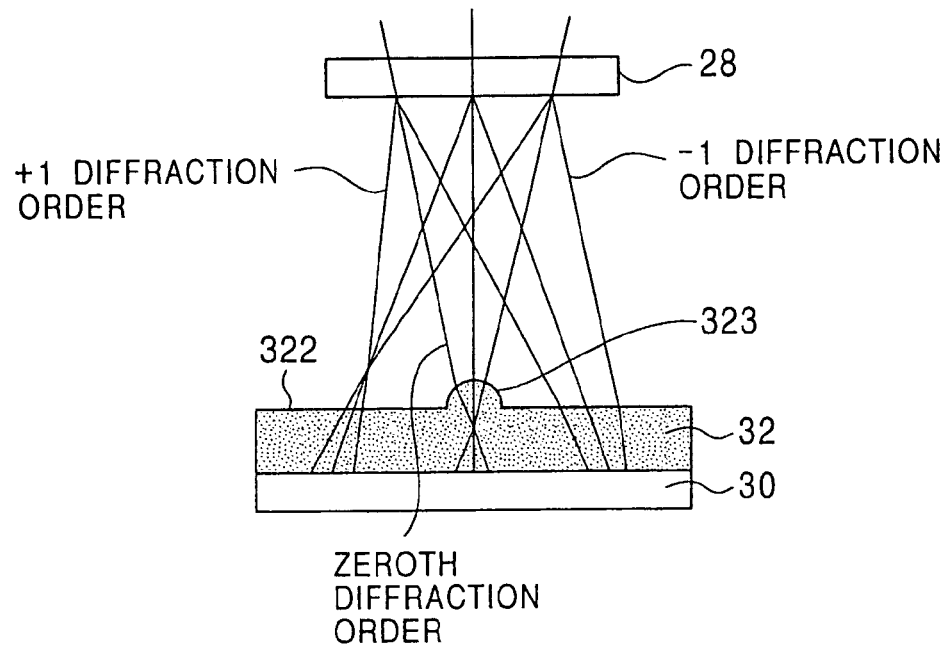
FIG. 10 is a schematic view of a critical portion of an optical device for detecting optical data, according to a fourth embodiment of the present invention.

FIG. 10 is an illustration of a critical portion of an optical device for detecting optical data, according to a fourth embodiment of the present invention.

The optical device shown in FIG. 10 includes a holographic element 28, a photo-detector 30, and an optical element 32 laminated on the photo-detector 30 in the same manner as in the third embodiment shown in FIG. 8. The optical device according to the fourth embodiment differs from the optical device shown in FIG. 8 in that a cylindrical convex lens 323 having a curvature in a direction perpendicular to the track direction of the optical disc 16 is provided at a part of the optical element 32 to which zeroth diffraction order from the holographic element 28 is applied. A section 322 other than the section of the cylindrical convex lens 323, to which ±1 diffraction orders are applied, is formed flat.

Since the cylindrical convex lens 323 is formed at a part of the optical element 32 to which the zeroth diffraction order is applied, according to the fourth embodiment, the zeroth diffraction order is affected by the focusing action of the cylindrical convex lens 323 of the optical element 32 so that the focal distances of the light components, which are disposed in a direction perpendicular to the track direction, of the zeroth diffraction order transmitted by the optical element 32 are decreased toward the front side of the light-receiving surface of the photo-detector 30, whereby the zeroth diffraction order forms light spots on the photo-detector 30 so as to each extend in a direction perpendicular to the track of the optical disc 16 in the same manner as in the third embodiment. Therefore, the light spots of the zeroth diffraction order can be each partially detected.

The planar section 322 of the optical element 32 to which the ±1 diffraction orders from the holographic element 28 are applied does not function as a lens. Therefore, the ±1 diffraction orders are directly transmitted by the optical element 32 and are applied to the photo-detector 30, whereby the ±1 diffraction orders form circular light spots on the photo-detector 30, as shown in FIG. 9.

Therefore, the same advantages are obtainable from the optical device according to the fourth embodiment as those of the optical device according to the third embodiment.

Figure 11:
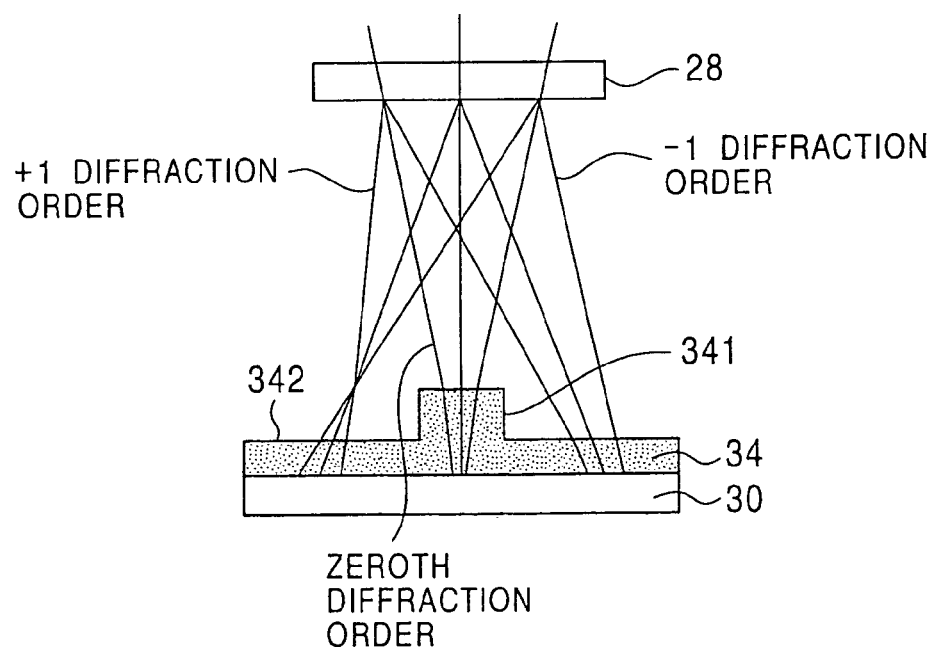
FIG. 11 is a schematic view of a critical portion of an optical device for detecting optical data, according to a fifth embodiment of the present invention.

FIG. 11 is an illustration of a critical portion of an optical device for detecting optical data, according to a fifth embodiment of the present invention.

In FIG. 11, the optical device according to the fifth embodiment includes the holographic element 28 and the photo-detector 30 which are the same as those used in the optical device according to the third embodiment shown in FIG. 8. The optical device according to the fifth embodiment differs from that which is used in the third embodiment in that an optical element 34 instead of the optical element 32, which has a configuration differing from that of the optical element 32, is laminated on the photo-detector 30.

The optical element 34 is formed such that a section 341 of the optical element 34, to which zeroth diffraction order from the holographic element 28 is applied, is thicker than other section 342 including a part to which ±1 diffraction orders are applied. The section 341 is formed flat.

In the optical device for detecting optical data, according to the fifth embodiment, the zeroth diffraction order transmitted through the section 341 which is thicker than the section 342 is refracted, whereby the focal point of the zeroth diffraction order is offset toward the rear side of the surface of the photo-detector 30. Therefore, the light spots of the zeroth diffraction order formed on the photo-detector 30 are enlarged and are formed as circles instead of the lines shown in FIG. 9, whereby the zeroth diffraction order applied to photo-detecting parts of the photo-detector 30 can be partially detected.

The ±1 diffraction orders transmitted through the section 342 which is thinner than the section 341 of the optical element 32 are applied to the photo-detector 30 such that the ±1 diffraction orders form circular light spots on the photo-detector 30 in the same fashion as the optical device according to the third embodiment, although the ±1 diffraction orders are slightly refracted at the section 342.

Therefore, the same advantages can be obtained from the optical device according to the fifth embodiment as those of the optical device according to the third embodiment.

Figure 12:
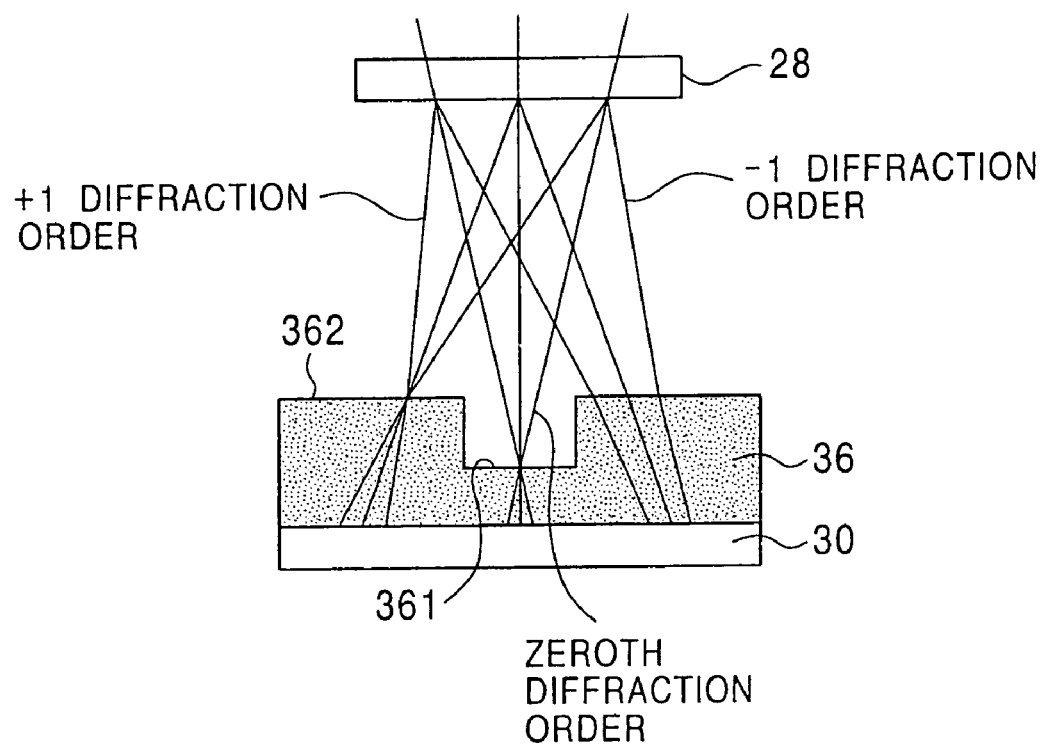
FIG. 12 is a schematic view of a critical portion of an optical device for detecting optical data, according to a sixth embodiment of the present invention.

FIG. 12 is an illustration of a critical portion of an optical device for detecting optical data, according to a sixth embodiment of the present invention.

In FIG. 12, the optical device according to the sixth embodiment includes the holographic element 28 and the photo-detector 30 which are the same as those used in the optical device according to the third embodiment shown in FIG. 8. The optical device according to the sixth embodiment differs from that which is used in the third embodiment in that an optical element 36 instead of the optical element 32, which has a configuration differing from that of the optical element 32, is laminated on the photo-detector 30.

The optical element 36 is formed such that a section 362 of the optical element 36, to which ±1 diffraction orders from the holographic element 28 are applied, is thicker than other section 361 to which zeroth diffraction order is applied. The sections 361 and 362 are each formed flat.

In the optical device for detecting optical data, according to the sixth embodiment, since the section 362 to which the ±1 diffraction orders are applied is formed thicker than the section 361 to which the zeroth diffraction order is applied, the light paths of the ±1 diffraction orders through the optical element 36 become longer than those of the zeroth diffraction order. Therefore, the focal point of the zeroth diffraction order from the holographic element 28 is offset toward the front side of the photo-detector 30 at the section 361. With this arrangement, the light spots formed on the photo-detector 30 by the zeroth diffraction order are circular and are enlarged in the same manner as shown in FIG. 11. Therefore, the zeroth diffraction order can be partially detected in the photo-detecting parts of the photo-detector 30.

Since the ±1 diffraction orders transmitted through the optical element 32 are refracted at the thicker section 362 and the light paths thereof are elongated, the ±1 diffraction orders form circular light spots on the photo-detector 30 in the same manner as in the optical device according to the third embodiment.

Therefore, the same advantages are obtainable from the optical device according to the sixth embodiment as those of the optical device according to the third embodiment.

Figure 13:
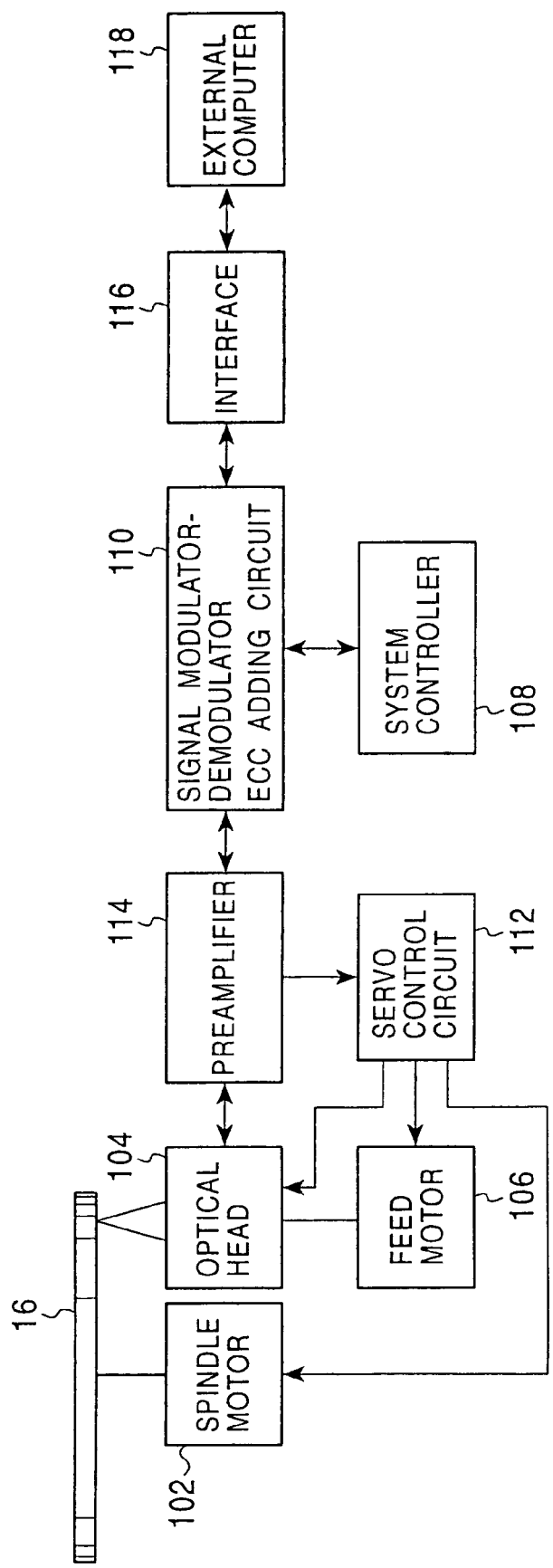
FIG. 13 is a block diagram of a reading-writing apparatus according to a seventh embodiment of the present invention, which uses the optical device for detecting optical data according to the present invention.

FIG. 13 is a block diagram of a reading-writing apparatus according to a seventh embodiment of the present invention, which uses an optical device for detecting optical data according to the present invention.

A reading-writing apparatus 100 includes a spindle motor 102 for driving an optical disc 16, an optical head 104, and a feed motor 106 for driving the optical head 104.

The optical head 104 has the configuration shown in FIG. 3 or 8. The spindle motor 102 is drive-controlled by a system controller 108 and a servo control circuit 112 and rotates at a given rotational speed.

A signal modulator-demodulator and ECC block 110 modulates and demodulates signals and adds ECCs (error correction codes). The optical head 104 applies light to a signal-recording face of the optical disc 16 in accordance with the command of the signal modulator-demodulator and ECC block 110. Writing is performed with the light applied to the signal-recording face of the optical disc 16.

The optical head 104 detects ±1 diffraction orders and zeroth diffraction order applied to a photo-detector through an optical element, which are obtained by splitting the light reflected from the signal-recording face of the optical disc 16 at a holographic element, as described in the above first to sixth embodiments, and supplies the signals corresponding to the ±1 diffraction orders and the zeroth diffraction order to a preamplifier 114.

The preamplifier 114 forms a focus error signal, a tracking error signal, an RF signal, and the like in accordance with the signals corresponding to the ±1 diffraction orders and the zeroth diffraction order. According to the type of recording medium from which reading is performed, given processes such as modulation and error correction are performed in accordance with the outputs from the servo control circuit 112, the signal modulator-demodulator and ECC block 110, and the like.

The modulated recording signals are sent, when they are to be sent to, for example, a data storage of a computer, to an external computer 118 via an interface 116. The external computer 118 can receive the recording signals written on the optical disc 16 as signals to be read.

When the modulated recording signals are for audio-visual use, they are digital-analog converted by a D/A converting unit of a D/A or A/D converter (not shown), and are supplied to an audio-visual device (not shown). The recording signals undergo AV signal processing in the audio-visual device and are sent to an external imaging apparatus via an audio-visual-signal input-output unit.

The optical head 104 is connected to the feed motor 106 for moving the optical head 104 to a given track of, for example, the optical disc 16. The control of the spindle motor 102 and the feed motor 106, and the control in focusing and tracking directions of a two-axis actuator or the like which supports an objective lens of the optical head 104 are performed by the servo control circuit 112.

That is, the focusing error signal $S_{FE}$ and the tracking error signal $S_{TE}$ are supplied to the servo control circuit 112 via the preamplifier 114. The servo control circuit 112 forms control signals for reducing the focusing error signal $S_{FE}$ and the tracking error signal $S_{TE}$, and supplies the control signals to the optical head 104, thereby controlling tracking and focusing.

When a required tracking control exceeds a range of control which the optical head 104 can perform, the tracking control signal is supplied to the feed motor 106 from the servo control circuit 112, thereby controlling the feed motor 106 for tracking. The operation of the spindle motor 102 for driving the optical disc 16 is controlled also by the servo control circuit 112.

The reading-writing apparatus for optical data according to the present invention can be easily manufactured and controlled without requiring high-accuracy processes by using the optical device shown in FIG. 3 or 7 as the optical head 104. When the optical device shown in FIG. 8, 10, 11, or 12 is used as the optical head 104, the light spots formed on a photo-detector by the ±1 diffraction orders can be symmetrical, the photo-detector can be reduced in size, and the reduction of the number of components, manufacturing costs, and the size of the apparatus can be made possible.

The present invention is not limited to the embodiments described above, and various applications and modifications may be made without departing from the spirit and scope of the present invention.

For example, the optical element according to the present invention is not limited to the optical element 32, 34, or 36. Any optical element may be used as long as it increases the diameter of the zeroth diffraction order diffracted by the holographic element 28 in a direction perpendicular to the track direction of the optical disc 16, and directly applies the ±1 diffraction orders diffracted by the holographic element 28 to the photo-detector 30 such that circular light spots are formed with the ±1 diffraction orders.

What is claimed is:

1. A method for detecting optical data by applying light from a light source to a recording medium and detecting by a photo-detector the light which has been reflected by the recording medium and which carries data from the recording medium, the method comprising the steps of:
    diffracting the reflected light into ±1 diffraction orders and zeroth diffraction order so as to dispose the focal points of the ±1 diffraction orders to be offset from each other along the optical axis of the zeroth diffraction order with the focal point of the zeroth diffraction order being between the focal points of the ±1 diffraction orders;
    detecting the zeroth diffraction order by the photo-detector by increasing the diameter of the zeroth diffraction order in a direction substantially perpendicular to the direction of a track of the recording medium; and
    detecting the ±1 diffraction orders by the photo-detector, the ±1 diffraction orders forming circular light spots on the photo-detector.

2. A method for detecting optical data by applying light from a light source to a recording medium and detecting by a photo-detector the light which has been reflected by the recording medium and which carries data from the recording medium, according to claim 1, wherein an optical element is laminated on the photo-detector, the zeroth diffraction order is applied to the photo-detector when the diameter of the zeroth diffraction order is increased by the optical element in a direction substantially perpendicular to the direction of the track, and the ±1 diffraction orders are applied to the photo-detector so as to form the circular light spots on the photo-detector.

3. An optical-data-detecting device for applying light from a light source to a recording medium and detecting the light which has been reflected by the recording medium and which carries data from the recording medium, the optical-data-detecting device comprising:
    a holographic element for diffracting the light reflected by the recording medium into ±1 diffraction orders and zeroth diffraction order and disposing the focal points of the ±1 diffraction orders to be offset from each other along the optical axis of the zeroth diffraction order with the focal point of the zeroth diffraction order being between the focal points of the ±1 diffraction orders;
    a photo-detector disposed at the diffraction light-emission side of the holographic element, for detecting the ±1 diffraction orders and the zeroth diffraction order; and
    an optical element laminated on a light-receiving surface of the photo-detector, for applying the zeroth diffraction order to the photo-detector while increasing the diameter of the zeroth diffraction order in a direction substantially perpendicular to the direction of a track of the recording medium, and applying the ±1 diffraction orders to the photo-detector so that the ±1 diffraction orders form circular light spots on the photo-detector.

4. An optical-data-detecting device for applying light from a light source to a recording medium and detecting the light which has been reflected by the recording medium and which carries data from the recording medium, according to claim 3, wherein the optical element comprises a flat plate including sections to which the zeroth diffraction order and the ±1 diffraction orders are respectively applied, the flat plate having different thicknesses according to the sections.

5. An optical-data-detecting device for applying light from a light source to a recording medium and detecting the light which has been reflected by the recording medium and which carries data from the recording medium, according to claim 3, wherein the optical element through which the zeroth diffraction order is transmitted comprises a section which is formed as a lens for increasing the diameter of the zeroth diffraction order in a direction substantially perpendicular to the track.

6. An optical-data-detecting device for applying light from a light source to a recording medium and detecting the light which has been reflected by the recording medium and which carries data from the recording medium, according to claim 3, wherein the optical element through which the zeroth diffraction order is transmitted comprises a section which is formed as a cylindrical lens having a curvature in a direction substantially perpendicular to the track.

7. An optical-data-detecting device for applying light from a light source to a recording medium and detecting the light which has been reflected by the recording medium and which carries data from the recording medium, according to claim 3, wherein the optical element serves as a protective material for protecting the light-receiving surface of the photo-detector.

8. A reading-writing apparatus for reading and writing optical data, comprising:
    a light source;
    driving means for driving a recording medium for rotation;
    an optical head for applying light from the light source to the rotating recording medium via an objective lens which is movably supported and detecting by a photo-detector via the objective lens the light which has been reflected by the recording medium and which carries data from a data-recording surface of the recording medium, the optical head comprising:
    a holographic element for diffracting the light reflected by the recording medium into ±1 diffraction orders and zeroth diffraction order and disposing the focal points of the ±1 diffraction orders to be offset from each other along the optical axis of the zeroth diffraction order with the focal point of the zeroth diffraction order being between the focal points of the ±1 diffraction orders;
    a photo-detector disposed at the diffraction light-emission side of the holographic element, for detecting the ±1 diffraction orders and the zeroth diffraction order; and
    an optical element laminated on a light-receiving surface of the photo-detector, for applying the zeroth diffraction order to the photo-detector while increasing the diameter of the zeroth diffraction order in a direction substantially perpendicular to the direction of a track of the recording medium, and applying the ±1 diffraction orders to the photo-detector so that the ±1 diffraction orders form circular light spots on the photo-detector;

a signal-processing circuit for forming a read signal in accordance with a detection signal outputted from the photo-detector; and a servo control circuit for moving the objective lens in accordance with the detection signal outputted from the photo-detector.

9. A reading-writing apparatus for reading and writing optical data, according to claim 8, wherein the optical element comprises a flat plate including sections to which the zeroth diffraction order and the ±1 diffraction orders are respectively applied, the flat plate having different thicknesses according to the sections.

10. A reading-writing apparatus for reading and writing optical data, according to claim 8, wherein the optical element through which the zeroth diffraction order is transmitted comprises a section which is formed as a lens for increasing the diameter of the zeroth diffraction order in a direction substantially perpendicular to the track.

11. A reading-writing apparatus for reading and writing optical data, according to claim 8, wherein the optical element through which the zeroth diffraction order is transmitted comprises a section which is formed as a cylindrical lens having a curvature in a direction substantially perpendicular to the track.

12. A reading-writing apparatus for reading and writing optical data, according to claim 8, wherein the optical element serves as a protective material for protecting the light-receiving surface of the photo-detector.

* * * * *